A. LOPPACKER.
AIR PUMP AND CLEANING DEVICE.
APPLICATION FILED JAN. 2, 1915.
1,314,277. Patented Aug. 26, 1919.
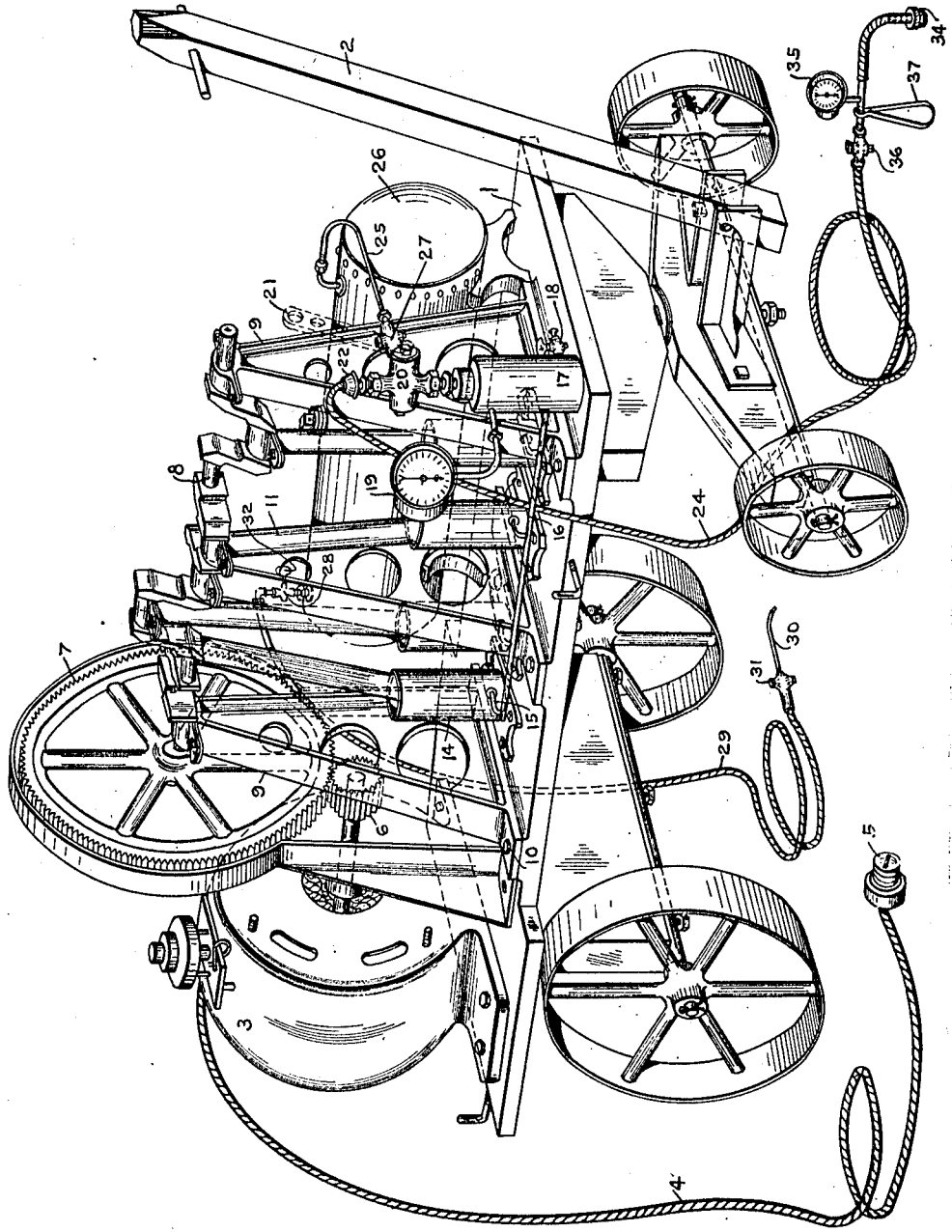

UNITED STATES PATENT OFFICE.

ALBERT LOPPACKER, OF BLOOMFIELD, NEW JERSEY, ASSIGNOR TO EUREKA AIR COMPRESSOR CO., OF BLOOMFIELD, NEW JERSEY, A CORPORATION OF NEW JERSEY.

AIR-PUMP AND CLEANING DEVICE.

1,314,277.   Specification of Letters Patent.   Patented Aug. 26, 1919.

Application filed January 2, 1915. Serial No. 67.

*To all whom it may concern:*

Be it known that I, ALBERT LOPPACKER, a citizen of the United States, residing at Bloomfield, in the county of Essex and State of New Jersey, have invented certain new and useful Improvements in Air-Pumps and Cleaning Devices, of which the following is a specification.

This invention relates to a garage accessory, in the nature of an air pump particularly adapted for filling tires combined with a spray cleaning device deriving its air pressure from the pump.

One of the objects of the invention is to provide a single air pump which may be caused to serve a conduit or line of pipe or hose for filling a tire or for any other purpose, and which pump when desired may be caused to discharge into a tank partly filled with cleansing liquid, from which tank the cleansing liquid may be discharged under pressure in the form of a spray.

Another object is to provide the necessary connections between the pump, the spray tank, and the line of tubing for tire filling purposes in such a way that entry of the cleansing liquid into the tire line, under pressure from the tank, is prevented.

Still another object is to trap any oil or other undesirable matter from the air passing into the tire line.

Another object is to provide on the tire line means whereby the pressure within a tire to which the said tire line is applied may be accurately indicated.

Other objects and aims of the invention, more or less broad than those stated above, together with the advantages inherent, will be in part obvious and in part specifically referred to in the course of the following description of the elements, combinations, arrangements of parts, and applications of principles constituting the invention; and the scope of protection contemplated will appear from the claims.

The accompanying drawing, which is to be taken as a part of this specification, and in which I have illustrated merely a preferred form of embodiment of the invention, is a perspective view.

Referring to the numerals on the drawing, there is indicated at 1 a wheeled truck having a draft handle 2. On one end of this truck is mounted an electric motor 3 from which leads a conductor 4 provided with a plug 5. On the motor shaft is a pinion 6 which meshes with a gear wheel 7 that is fixed on the end of a crank shaft 8 supported in bearings on the upper ends of standards 9 which are bolted to the truck, as indicated at 10. Connecting rods 11 extend to the ordinary pistons 12 within cylinders 14 which are bolted to the truck. These cylinders 14 have at their lower ends individual air intakes, controlled by usual check valves, and the cylinders have also air outlets 15 which lead to a common discharge pipe 16. Pipe 16 extends into a trap 17, which is in the nature of a cylinder secured to the truck and having at its lower end a pet cock 18 by which the trap may be drained. Trap 17 is also provided with a pressure gage 19, and at the upper end of the trap there is a fixture 20, which is in the nature of a three-way valve, controlled by a handle 21. One branch of this three-way valve 20 leads into the trap 17, another branch, indicated by the numeral 22, leads into a tire line or hose 24; and the third branch leads by way of a pipe 25, into a tank 26. There is interposed in the pipe 25, between the tank 26 and the three-way valve 20, a check valve 27, which permits of the passage of air from the three-way valve 20 into the tank, but prevents the passage of the contents of the tank backwardly into the three-way valve.

There is a fitting 28 on the tank 26 to which is connected a tube 29 having at its end a spray nozzle 30 controlled by a spring pressed valve 31. Preferably, also there is a valve 32 in the fitting 28 so that the escape of the contents of the tank into the tubing 29 may be controlled as desired. The tire line 24 has at its end a nipple 34 which engages with the tire inlet tube, automatically opening the valve of the latter. To the rear of this nipple 34 there is a pressure gage 35, and to the rear of the pressure gage there is a check valve 36, which permits the passage of air through it toward the nipple 34, but prevents the passage of air backward. The result of this arrangement is that as soon as the nipple 34 is attached to a tire, it automatically opens the check valve of the tire inlet tube, and the pressure in the tire is indicated by the gage 35. This indication is not affected at all by the fluctuating pressure of the air pump, because that is prevented by the check valve 36. In other words, the gage 35 gives a true reading at all times of the pressure conditions within the tire. A further advantage is that the back pressure from the tire does not affect the working of the air pump. Preferably, the end of the tire line 24 is formed into a sort of hand piece, with a hook or handle 37 by which it may be hung up out of the way when not in use.

The general operation and use of the machine may be understood from the foregoing description of parts and their functions. If it is desired to use the air pump for filling a tire, the handle 21 is turned so that there is a passage from the trap 17 into the tire line 24, while, at the same time, the passage from the trap 17 to the tank 26 by way of the pipe 25 is cut off. If the motor 3 be now put into operation, air will be drawn into the cylinders 14 in succession on the upstroke of each piston 12, and compressed on the down stroke of such piston and forced into the common pipe 16, thence into the trap 17, where any oil or other foreign matter in suspension will be trapped, and thence into the tire line 24. If it be desired to use the cleaning spray, the handle 21 is turned so as to open the passage between the trap 17 and the pipe 25, while, at the same time, closing the passage between the trap 17 and the tire line 24. If the pump be now operated, the air under pressure will pass through the trap 17 and pipe 25 into the tank 26. Within the tank 26 there is placed a quantity of kerosene or some other cleaning fluid, and when sufficient pressure is secured within the tank by the operation of the air pump, the valve 32 is opened, whereupon a spray of the cleaning fluid under pressure will issue from the nozzle 30, upon manipulation of the thumb valve 31. The spraying may go on simultaneously with the discharge of air from the pumps into the tank, or the air pressure may be stored up in the tank and released when desired without starting up the pump. In other words, the tank is a pressure reservoir. It will be apparent that if the check valve 27 were not included in the combination, the back pressure from the tank 26 would discharge the cleaning fluid from the tank into the tire line, with deleterious result to the material of the tire. It is, therefore, most important to provide this check valve 27. I also find that the trap 17 is quite essential in the combination. When this trap is not present, the oil used in lubricating the cylinders and pistons, being forced out into the common line 16, inevitably finds its way into the tire line 24. But on account of the trap 17, all such foreign matter is kept out of the tire line. If desired, this trap 17 may be provided with baffles, but I have found that an ordinary cylinder, with the inlet at one end and with the outlet at the top will answer every purpose, provided that the drain cock 18 is made use of with sufficient frequency. The gage 19 opening into the trap, indicates the pressure in the compression system, while, as before explained, the gage 35 indicates merely the pressure conditions within the tire.

Inasmuch as many changes could be made in the above construction, and many apparently widely different embodiments of my invention could be made without departing from the scope thereof, it is intended that all matter contained in the above description or shown in the accompanying drawings shall be interpreted as illustrative and not in a limiting sense.

It is also to be understood that the language used in the following claims is intended to cover all the generic and specific features of the invention herein described and all statements of the scope of the invention which, as a matter of language, might be said to fall therebetween.

I claim:

1. A device of the kind described comprising an air pump, an oil trap connected to the outlet of the pump, a drain for said trap, a three-way valve fitting communicating with the interior of said trap, a tank connected to one branch of the three-way valve fitting, a line of tubing connected to a second branch of the fitting, the third branch of the fitting communicating with the trap, a valved plug associated with the fitting and adapted when operated to put either the tank or the line of tubing in direct communication with the trap to supply a constant working pressure thereto, a pressure gage connected to said trap, and a check valve in the connection between the tank and the valve fitting.

2. A device of the kind described comprising an air pump, an oil trap connected to the outlet of the pump, a drain for said trap, a three-way valve fitting communicating with the interior of said trap, a tank connected to one branch of the three-way valve fitting, a line of tubing connected to a second branch of the fitting, the third branch of the fitting communicating with the trap, a valved plug associated with the fitting and adapted when operated to put either the tank or the line of tubing in direct communication with the trap to supply a constant working pressure thereto, a pressure gage connected to said trap, a check valve in the connection between the tank and the valve fitting, a nipple on the end of said line of tubing, a pressure gage on the line of tubing back of said nipple and a check valve on the line of tubing back of said pressure gage, said last-named check valve preventing the passage of fluid rearwardly into the tubing, but permitting the passage of fluid through the tubing toward the nipple.

3. A device of the kind described comprising an air pump, an oil trap connected to the outlet of the pump, a drain for said trap, a three-way valve connected with the trap, a tank connected to one branch of the three-way valve, a check valve in the connection between the valve and the tank, a line of tubing connected to a second branch of said valve, the third branch communicating with said trap, said three-way valve adapted to control direct communication between the trap and either the tank or line of tubing to constantly supply a working pressure thereto, a tube connected to said tank and provided with a valve to control the discharge therefrom, a pressure gage connected to said trap, the line of tubing connected to the second branch of said three-way valve being provided at its end with a nipple, a pressure gage on the tubing rearwardly of the nipple and a check valve rearwardly of the pressure gage.

4. A device of the kind described comprising a constant air supply, a tire inflating hose, and a liquid spraying element and optional means for supplying either the hose or the spraying element with a constant working pressure from the air supply.

5. In a combined sprayer and tire filler, comprising a reservoir containing fluid to be discharged under an air pressure and a hose line for filling a tire, a pump common to both the reservoir and the hose line and optional means for supplying either with a constant working pressure from the pump.

6. In a portable device of the kind described comprising an air pump, a trap connected to the outlet of the pump, a tank, a tire inflating hose line, connections between the tank and the trap and the hose line and the trap and optional means for supplying either the tank or the hose line with a constant working pressure from the trap.

In testimony whereof I affix my signature in presence of two witnesses.

ALBERT LOPPACKER.

Witnesses:
HELEN V. FITZPATRICK,
MARY H. LEWIS.

Copies of this patent may be obtained for five cents each, by addressing the "Commissioner of Patents, Washington, D. C."